May 28, 1940.    T. M. KNOX    2,202,347
FEATHER QUILLING MACHINE
Filed Aug. 3, 1939

INVENTOR:
THEODORE M. KNOX;
BY: Christian R. Nielsen
ATTORNEY.

Patented May 28, 1940

2,202,347

UNITED STATES PATENT OFFICE 2,202,347

FEATHER QUILLING MACHINE

Theodore M. Knox, Chicago, Ill.

Application August 3, 1939, Serial No. 288,250

6 Claims. (Cl. 19—4)

The invention relates to a machine for quilling feathers, and it consists in the constructions, arrangements and combinations herein described and claimed.

It is a cardinal object of the invention to provide a machine of extreme simplicity and operation which will effectively remove feathers from the quills as well as separate the feathers and quills in an automatic manner.

It is also an object of the invention to provide means whereby the grade of feathers may be regulated.

Additional objects, advantages and features of invention will be apparent from the following description, considered in conjunction with the accompanying drawing, wherein—

Figure 2:
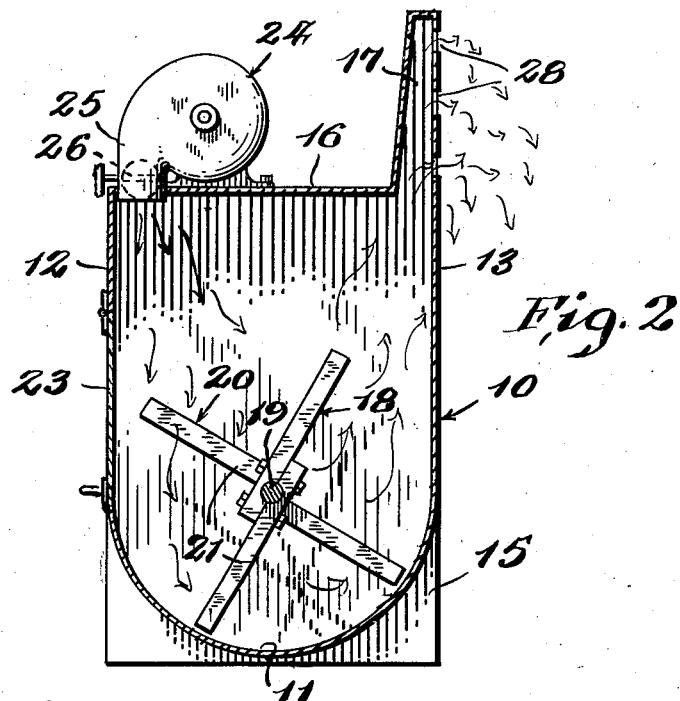
Figure 2 is a vertical cross section thereof.
Figure 1:
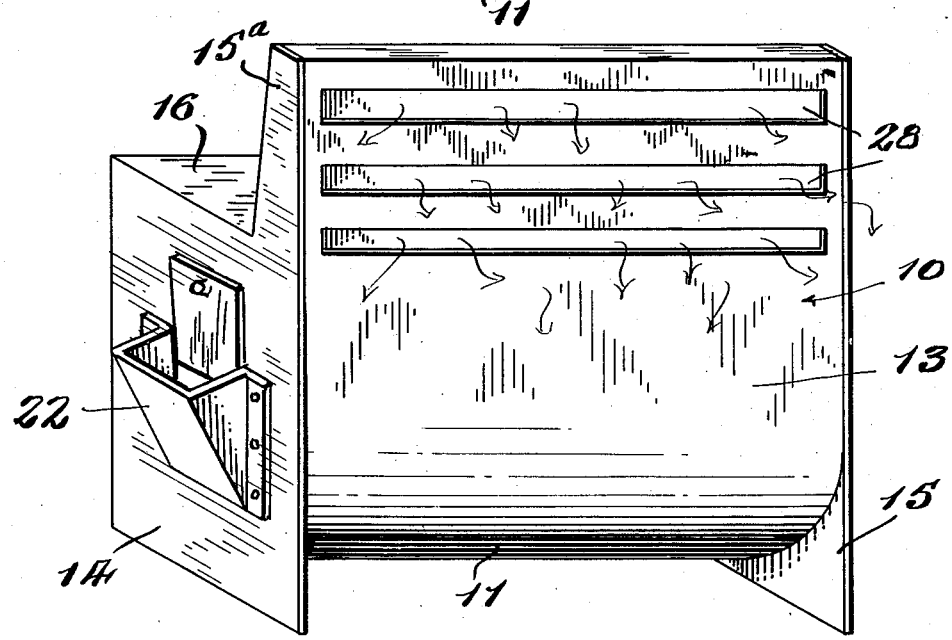
Figure 1 is a perspective view of the machine constructed in accordance with the invention.

Heretofore, feather dealers have suffered considerable loss of valuable portions of the feather proper, due to the fact that it has been impossible to entirely remove the feather from the quill, and this is particularly true where the dressers have employed rosin upon their hands to assist in the dressing of the fowl. Then, too, poultry dealers quite often mix reclaimable feathers with quills which are to be discarded, and in actual operation of my machine, it has been found that as high as 20 percent of the bulk has been reclaimed as usable feathers.

For an understanding of the construction of the machine attention is now invited to the drawing, wherein I have illustrated a housing 10 having a rounded bottom wall 11 and integrally connected side walls 12 and 13. The side and bottom walls are connected at their ends by respective end walls 14 and 15. The end walls 14 and 15 project slightly below the bottom wall, affording a stable footing for the housing.

The side wall 12 is of lesser height than the opposite wall 13, and end walls 14 and 15 are provided with a tapering extension 15a of a height corresponding to the height of the side wall 13. A top wall 16 is connected between the side and end walls to complete the housing. Due to the difference in height of the walls 12 and 13, the top wall 16 extends upwardly and at a slight angle with respect to the wall 13, providing an upwardly tapering throat 17 affording exit of the reclaimable portion of the feathers.

Rotatably mounted in the end walls 14 and 15, I provide a beater 18 which comprises a shaft 19, driven from a suitable source of power, such as a motor (not shown).

Upon the shaft 19 there is provided a series of beater paddles 20 secured to the shaft in any approved manner, the paddles consisting of a series of suitably spaced blades 21 extended at right angles to each other and of a length to clear the rounded wall 11 of the housing, but sufficiently close to assist separation of the feathers from the quills.

The end wall 14 includes a feed hopper 22 into which the feathers are deposited, the hopper opening upon the housing and discharging to a position to be readily acted upon by the paddles 21. The end wall 12 includes a door 23 which may be swung to a position to readily remove quills or other foreign matter from the housings.

Upon the top wall 16 there is provided a blower 24 having an exhaust 25 opening upon the interior of the housing, the exhaust 25 including a damper 26 for regulating the entrance of air to the housing, for a purpose presently to be explained. The blower 24 may be driven through any suitable means, not shown.

It should be noted that the blower 24 is mounted so that the exhaust 25 is positioned at right angles to the top and for this reason the air discharged therefrom will tend to follow the walls and the bottom and very effectively elevate feathers from the quills under rotation of the beater paddles.

The wall 13 of the housing at a point adjacent the throat 17 is provided with a series of openings 28 of graduated increasing size extending approximately the length of the housing, these openings functioning as discharge ports for the reclaimed portions of the feathers, and are preferably spaced vertically of the wall one above the other.

In use, the quills are ground or disintegrated in a suitable mill and the bulk deposited in the machine through the hopper 22. The blades 21 will beat up the conglomeration of quills and feathery portions and the air blown into the housing by the blower 24 will cause the lighter portions such as the feathers proper or down to be elevated up into the throat 17 where it may pass out through the ports 28. In view of the fact that the ports 28 are of increasing size in an upward direction, full advantage of the air in the machine is obtained.

If it is desired to vary the grade of feathers separated from the quills, this may be effected through the adjustment of the damper valve 26. The less air admitted into the machine will result in the lighter feathers being elevated from the machine while an increase in air will elevate heavier feathers, as well.

The quills may be removed by way of the door 23.

While I have shown and described a preferred construction, this is by way of illustration only and I consider as my own, all such modifications in structure as fairly fall within the scope of the appended claims.

I claim:

1. In a quilling machine, a housing having a rounded bottom wall; side and end walls, a top for the housing, an upwardly directed hollow extension having discharge ports adjacent the top, a rotatable agitator within the housing, and a blower carried by the top, said blower having a discharge port opening upon the housing at right angles to the top.

2. In a quilling machine, a housing having a rounded bottom wall; side and end walls, one of said side walls having a height greater than the other, the end walls having an upwardly tapering extension of a height corresponding to the height of the highest wall and complemental thereto, a top wall for the housing having a portion complemental to the tapering extensions of the end walls and the adjacent side wall, defining a throat, said throat having ports formed in the outer wall thereof, a rotatable agitator within the housing, and a blower mounted on the top, said blower having a discharge duct opening upon the housing at right angles to the top.

3. The structure of claim 2 in which the discharge duct includes a damper.

4. The structure of claim 2 in which one end wall comprises a hopper for discharge of quills into the housing.

5. In a quilling machine, a housing having a rounded bottom wall; side and end walls, one of said side walls having a height greater than the other, the end walls having an upwardly tapering extension of a height corresponding to the height of the highest wall and complemental thereto, a top wall for the housing having a portion complemental to the tapering extensions of the end walls and the adjacent side wall, defining a throat, said throat having ports formed in the outer wall thereof, said ports being vertically spaced one above the other and of increasing size, a rotatable agitator within the housing, and a blower mounted on the top, said blower having a discharge duct opening upon the housing at right angles to the top.

6. In a quilling machine, a housing having a rounded bottom wall; side and end walls and a top for the housing, a rotatable agitator within the housing, a blower carried by the top, said blower having a discharge duct opening upon the housing at right angles to the top, said top having an upwardly directed hollow extension having discharge ports adjacent the top, said extension being positioned upon the top opposite that of the blower, and a damper in the discharge duct of the blower.

THEODORE M. KNOX.